(12) United States Patent
Yang et al.

(10) Patent No.: US 12,477,850 B2
(45) Date of Patent: Nov. 18, 2025

(54) IMAGE SENSOR PIXEL ARRAY HAVING MINIMAL REPEATING UNIT

(71) Applicant: OmniVision Technologies, Inc., Santa Clara, CA (US)

(72) Inventors: Xiaodong Yang, San Jose, CA (US); Masao Sambongi, Fremont, CA (US); Chengming Liu, Fremont, CA (US); Chen Zhang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 438 days.

(21) Appl. No.: 18/177,826

(22) Filed: Mar. 3, 2023

(65) Prior Publication Data

US 2024/0297191 A1   Sep. 5, 2024

(51) Int. Cl.
*H10F 39/00*   (2025.01)
*H10F 39/18*   (2025.01)

(52) U.S. Cl.
CPC ....... *H10F 39/8053* (2025.01); *H10F 39/182* (2025.01); *H10F 39/8063* (2025.01)

(58) Field of Classification Search
CPC .............. H10F 39/182; H10F 39/8053; H10F 39/8063; H04N 25/134; H04N 25/46; H04N 23/84
See application file for complete search history.

(56) References Cited

U.S. PATENT DOCUMENTS

| 8,068,153 | B2 | 11/2011 | Kumar et al. |
| 9,479,745 | B2 | 10/2016 | Lu et al. |
| 11,284,045 | B2 | 3/2022 | Chen et al. |
| 11,367,744 | B2 | 6/2022 | Pang et al. |

FOREIGN PATENT DOCUMENTS

CN   118118805 A  *  5/2024  ........... H04N 25/671

* cited by examiner

*Primary Examiner* — Justin W Rider

(57) ABSTRACT

In an embodiment, an image sensor comprises a pixel array having a minimal repeating unit, where the minimal repeating unit consists of 4×4 pixels including 12 green pixels, 2 blue pixels, and 2 red pixels, where a minimal repeating unit is immediately next to another minimal repeating unit in row and column directions. In another embodiment, an image sensor comprises a pixel array having a minimal repeating unit, where the minimal repeating unit consists of 8×8 pixels including 48 green pixels, 8 blue pixels, and 8 red pixels.

26 Claims, 21 Drawing Sheets

IMAGE SENSOR PIXEL ARRAY HAVING MINIMAL REPEATING UNIT

FIELD OF THE INVENTION

This invention relates to an image sensor pixel array having a minimal repeating unit, and more specifically relates to an image sensor pixel array having a minimal repeating unit that does not include clear pixels.

BACKGROUND OF THE INVENTION

Image sensors can capture color images by combining a pixel array of photosensitive pixels with a set of color filters. Each pixel in the pixel array is coupled to a filter that removes all but a particular wavelength—that is, a particular color of light—from the light incident on the image sensor. As a result, each pixel in the pixel image captures light of a single color, and for each pixel the color values for the other colors are interpolated.

In an embodiment, an image sensor pixel array may include clear pixels. Clear pixels use filters that pass all wavelengths of light to the image sensor. Clear pixels may simply have no filters. The sensitivity can be gained by using a clear pixel in the pixel array, but it may increase crosstalk resulting in low color performance. Accordingly, a pixel array including no clear pixel is demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
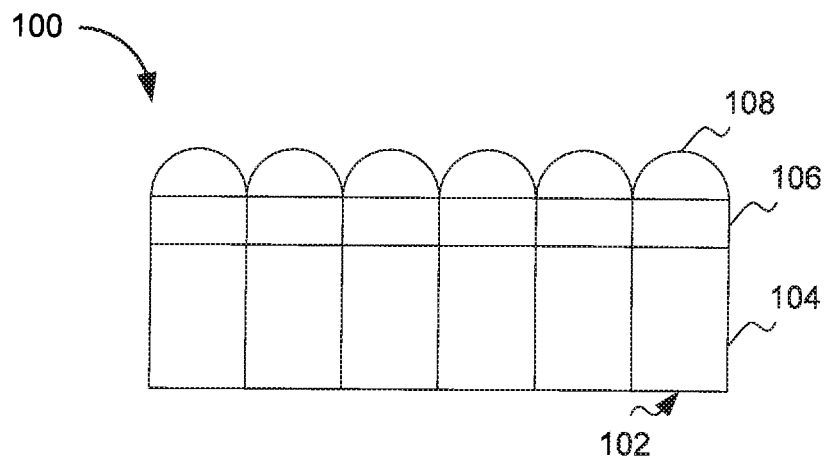
FIG. 1A shows a cross-section view of an image sensor pixel array including a plurality of pixels.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1A shows a cross-section view of a pixel array 100 of an image sensor including a plurality of pixels 102. Each pixel 102 comprises a photodiode 104, a color filter 106, and a microlens 108. Pixel 102 may have other elements not shown in the drawing. Color filter 106 may be red (R), green (G), or blue (B) color filter. Pixel 102 may have no color filter or a filter that passes all wavelengths of light. These pixels may be referred as pixels having clear (C) color filters. Pixels having red color filters may be referred as red pixels. Pixels having green color filters may be referred as green pixels. Pixels having blue color filters may be referred as blue pixels. Pixels having clear color filter may be referred as clear pixels.

Figure 1B:
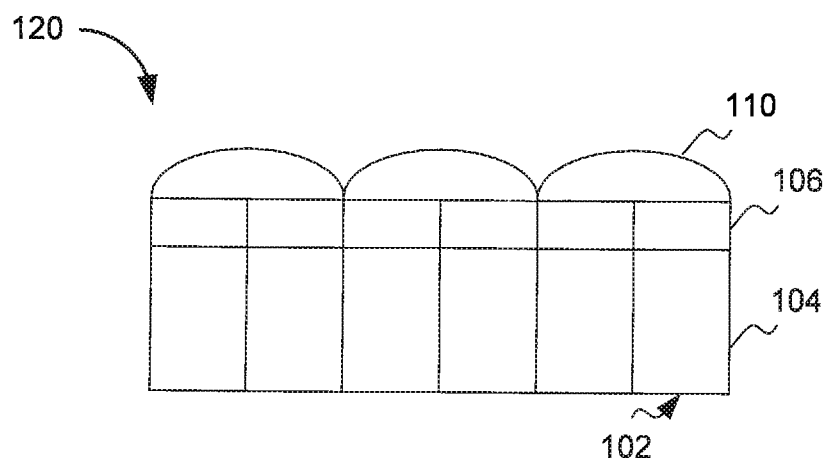
FIG. 1B shows a cross-section view of an image sensor pixel array including a plurality of pixels.

FIG. 1B shows a cross-section view of a pixel array 120 of an image sensor including a plurality of pixels 102. FIG. 1B is similar to FIG. 1A, except a microlens 110 covers four, e.g., 2×2, neighboring pixels instead of one pixel. Two pixels under microlens 110 are shown in the cross-section view. Microlens 110 may cover four pixels having same color or different colors.

Figure 2A:
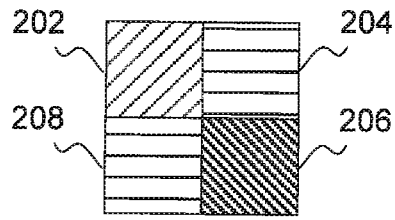
FIG. 2A shows a standard Bayer pattern comprising a blue pixel, a red pixel, and two green pixels.

FIG. 2A shows a standard Bayer pattern 200 comprising a blue pixel 202, a green pixel 204, a red pixel 206, and another green pixel 208. Bayer pattern 200 consists of 2×2 pixels. Blue pixel 202 detects blue signal at the location of blue pixel 202. Green pixel 204 detects green signal at the location of green pixel 204. Red pixel 206 detects red signal at the location of red pixel 206. Green pixel 208 detects green signal at the location of green pixel 208. Bayer pattern 200 has 50% part of green pixels, 25% part of blue pixel, and 25% part of red pixel. At the location of blue pixel 202, no red signal and no green signal are detected. Similarly, green pixel 204 has no blue and red signals, red pixel 206 has no blue and green signals, green pixel 208 has no blue and red signals.

Figure 2C:
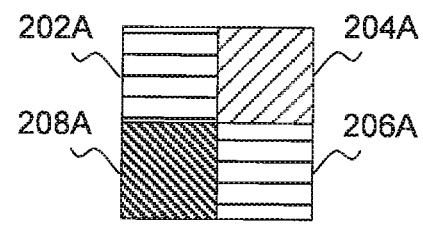
FIG. 2C shows a pattern being an alternative pattern to a standard Bayer pattern.
Figure 2B:
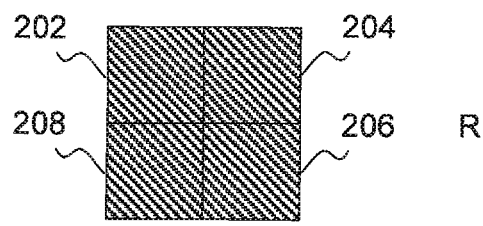
FIG. 2B shows each pixel having red, green, and blue signals after demosaicing a Bayer pattern.
Figure 2B:
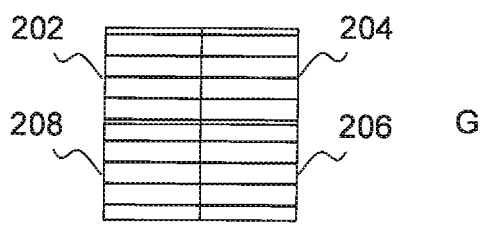
Figure 2B:
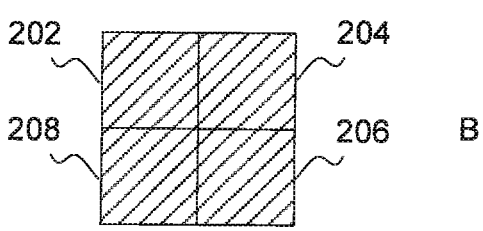

After demosaicing, for example by interpolation, all pixels 202, 204, 206, and 208 may have all red (R), green (G), and blue (B) signals as schematically shown in FIG. 2B. FIG. 2B shows each pixel having red, green, and blue signals after demosaicing a Bayer pattern. Many standard demosaicing algorithms are available, and they will not be discussed further here, since it is not essential to the present invention.

FIG. 2C shows a pattern 220, which is an alternative pattern to standard Bayer pattern 200. Pattern 220 comprises a green pixel 202A, a blue pixel 204A, another green pixel 206A, and a red pixel 208A. Pattern 220 is a mirror image of Bayer pattern 200, flipped over horizontally, i.e., left side becomes right side and vise versa.

Figure 2D:
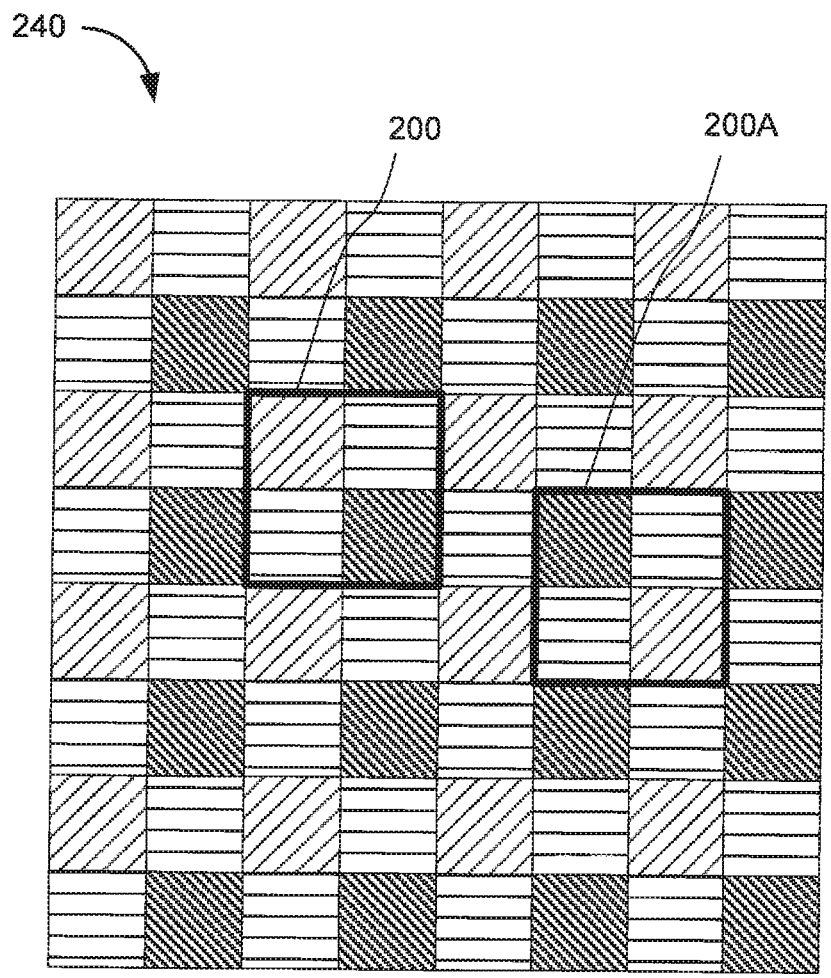
FIG. 2D shows a top view of a pixel array of an image sensor comprising a Bayer pattern.

FIG. 2D shows a top view of a pixel array 240 of an image sensor comprising a Bayer pattern 200. Bayer pattern 200 is repeated in pixel array 240. Bayer pattern 200 is a minimal repeating unit in pixel array 240. A minimal repeating unit is immediately next to another minimal repeating unit in row and column directions. A minimal repeating unit is a repeating unit such that no other repeating unit has fewer individual pixels. A pixel array can include several different repeating units, but a repeating unit is not a minimal repeating unit if there is another repeating unit in the pixel array includes fewer individual pixels. Bayer pattern 200 is a standard minimal repeating unit. A pattern 200A may be considered a minimal repeating unit as well. Pattern 200A may be recognized as a Bayer pattern as well.

Figure 3A:
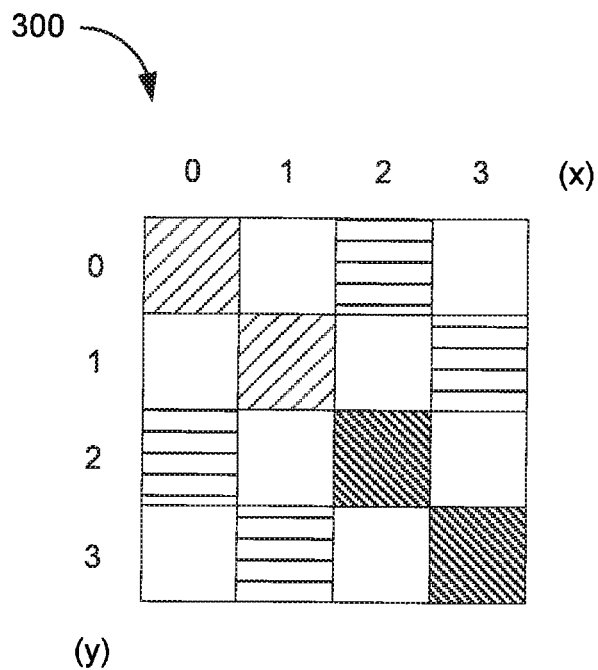
FIG. 3A shows a RGBC (red-green-blue-clear) pattern.

FIG. 3A shows a RGBC (red-green-blue-clear) pattern 300 consisting of 4×4 pixels. Pixels (0,0) and (1,1) are blue pixels. Pixels (2,2) and (3,3) are red pixels. Pixels (2,0), (3,1), (0,2), and (1,3) are green pixels. Pixels (1,0), (3,0), (0,1), (2,1), (1,2), (3,2), (0,3), and (2,3) are clear pixels. RGBC pattern 300 has 50% part of clear pixels, 25% part of green pixels, 12.5% part of blue pixels, and 12.5% part of red pixels.

Figure 3B:
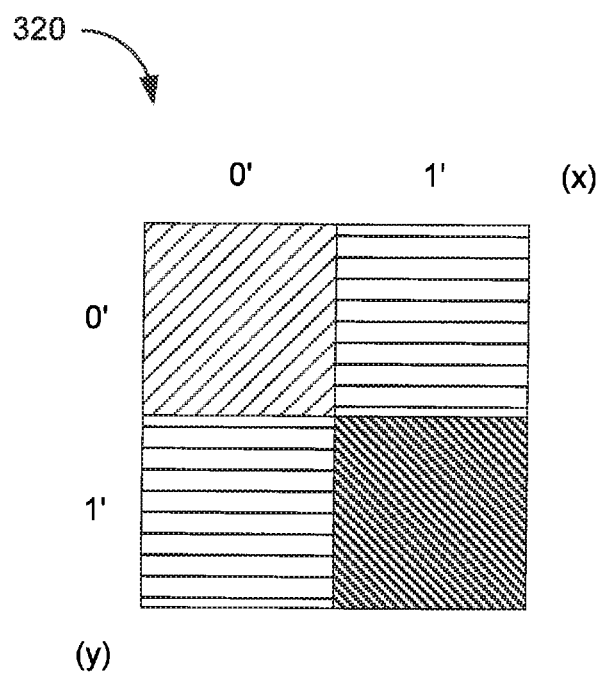
FIG. 3B shows an averaged pattern of RGBC pattern.

FIG. 3B shows an averaged pattern 320 of RGBC pattern 300. Blue pixels (0,0) and (1,1) are combined as pixel (0', 0') in averaged pattern 320. Red pixels (2,2) and (3,3) are combined as pixel (1', 1') in averaged pattern 320. Green pixels (2,0) and (3,1) are combined as pixel (1',0') in averaged pattern 320. Other green pixels (0,2) and (1,3) are combined as pixel (0',1') in averaged pattern 320. Averaged pattern 320 has reduced resolution, e.g., half resolution, while RGBC pattern 300 has full resolution. Averaged pattern 320 is same as Bayer pattern 200, thus it can be demosaiced to produce all R, G, and B signals as shown in FIG. 2B. The demosaiced R, G, and B signals are in reduced resolution.

Figure 3C:
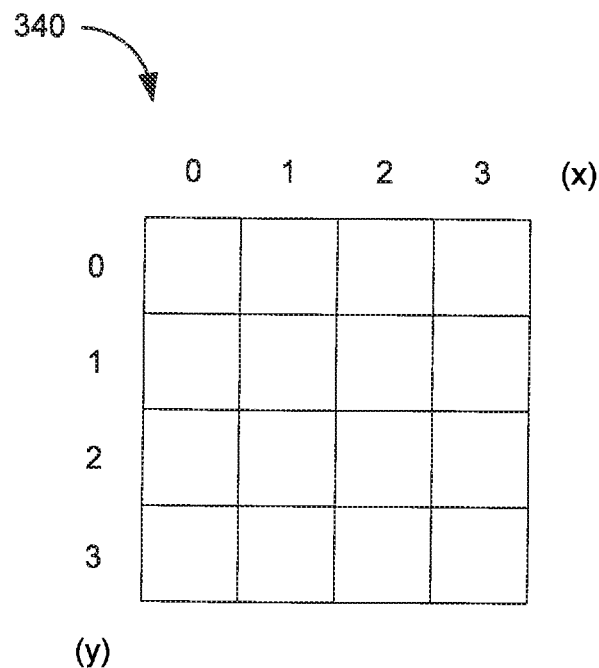
FIG. 3C shows an interpolated pattern of clear pixels of RGBC pattern.

To get back to the full resolution, averaged pattern 320 may be combined with an interpolated pattern 340 of clear pixels as shown in FIG. 3C. Interpolated pattern 340 of clear pixels has full resolution and may represent a luminance image. Clear signals at pixels (0,0), (2,0), (1,1), (3,1), (0,2), (2,2), (1,3), and (3,3) are interpolated from neighboring pixels or pixels in the vicinity. The combined image from averaged pattern 320 and interpolated pattern 340 produces R, G, and B signals in full resolution. Standard algorithms for this process are available, and they will not be discussed further here, since it is not essential to the present invention.

In an embodiment, an image sensor comprises a pixel array having a minimal repeating unit. A minimal repeating unit is immediately next to another repeating unit in row and column directions. Minimal repeating units are arranged in a pixel array as shown in FIG. 2D.

Figure 4A:
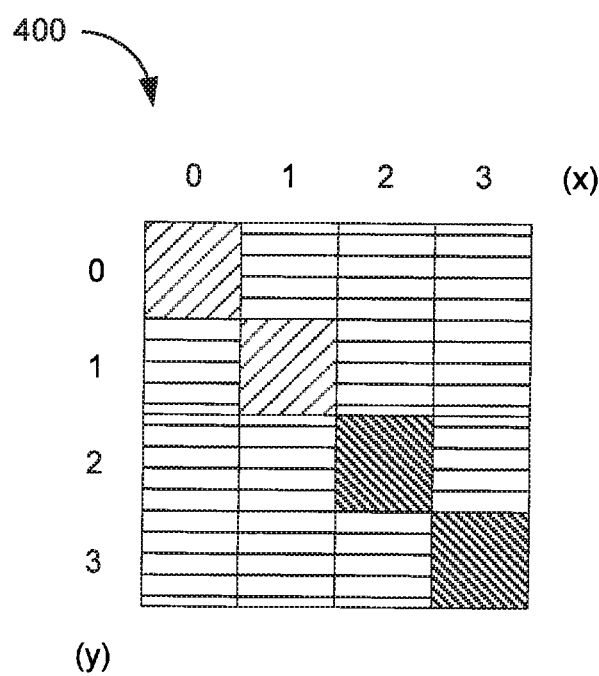
FIG. 4A shows a minimal repeating unit consisting of 4×4 pixels, in accordance with the present invention.

FIG. 4A shows a minimal repeating unit 400 consisting of 4×4 pixels, in accordance with the present invention. Pixels (0,0) and (1,1) are blue pixels. Pixels (2,2) and (3,3) are red pixels. Pixels (1,0), (2,0), (3,0), (0,1), (2,1), (3,1), (0,2), (1,2), (3,2), (0,3), (1,3), and (2,3) are green pixels. Minimal repeating unit 400 has 16 pixels, which have 75% part of green pixels (i.e., 12 green pixels), 12.5% part of blue pixels (i.e., 2 blue pixels), 12.5% part of red pixels (i.e., 2 red pixels), and no clear pixel. Minimal repeating unit 400 is:

| B | G | G | G |
| G | B | G | G |
| G | G | R | G |
| G | G | G | R |

B stands for blue pixel, G stands for green pixel, and R stands for red pixel.

Figure 4B:
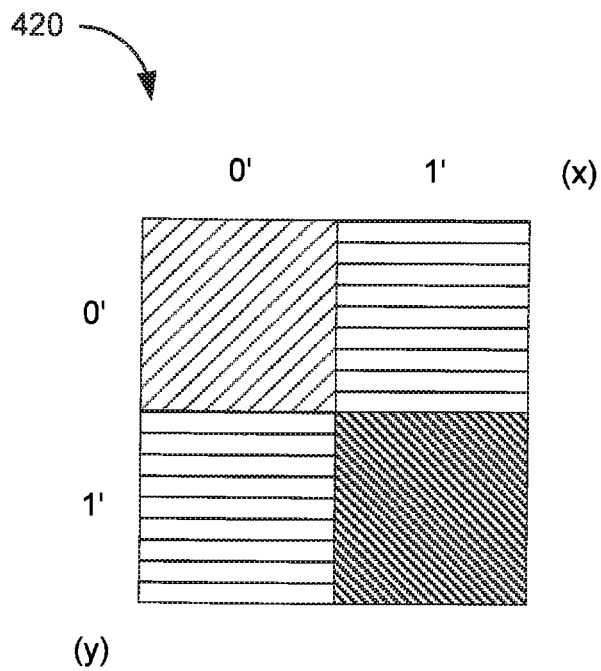
FIG. 4B shows an averaged pattern of minimal repeating unit, in accordance with the present invention.

FIG. 4B is similar to FIG. 3B. FIG. 4B shows an averaged pattern 420 of minimal repeating unit 400, in accordance with the present invention. Blue pixels (0,0) and (1,1) are combined as pixel (0',0') in averaged pattern 340. Red pixels (2,2) and (3,3) are combined as pixel (1',1') in averaged pattern 420. Green pixels (2,0) and (3,1) are combined as pixel (1', 0') in averaged pattern 420. Other green pixels (0,2) and (1,3) are combined as pixel (0', 1') in averaged pattern 420. Averaged pattern 420 has reduced resolution, e.g., half resolution, while minimal repeating unit 400 has full resolution. Averaged pattern 420 is same as Bayer pattern 200, thus it can be demosaiced to produce all R, G, and B signals. The demosaiced R, G, and B signals are in reduced resolution.

Figure 4C:
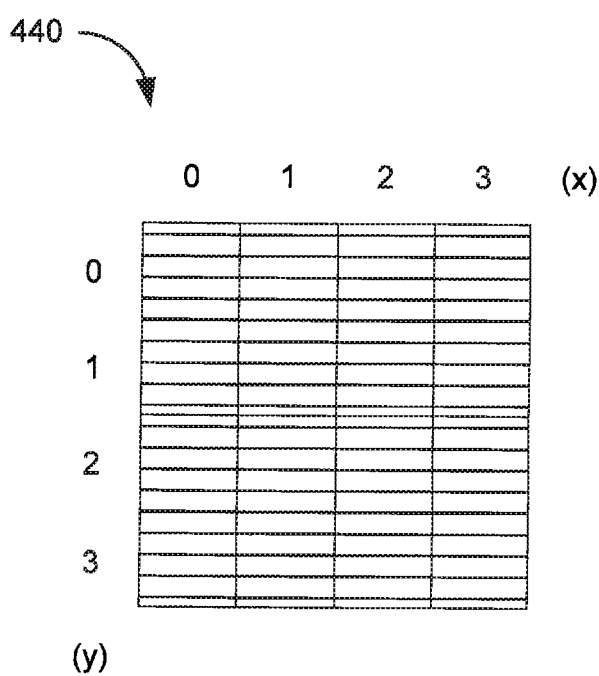
FIG. 4C shows an interpolated pattern of green pixels of minimal repeating unit, in accordance with the present invention.

Similar to FIG. 3C, to get back to the full resolution, averaged pattern 420 may be combined with an interpolated pattern 440 of green pixels of minimal repeating unit 400 as shown in FIG. 4C, in accordance with the present invention. Interpolated pattern 440 of green pixels has full resolution and may represent a luminance image. Green signals at pixels (0,0), (1,1), (2,2), and (3,3) are interpolated from neighboring pixels or pixels in the vicinity. The combined image from averaged pattern 420 and interpolated pattern 440 produces R, G, and B signals in full resolution. For example, algorithms similar to that of FIG. 3C may be applied.

The combination of averaged pattern 420, which is a Bayer pattern having reduced resolution, and interpolated pattern 440 will produce better color performance as compared to the interpolation pattern 340 of clear pixels. Interpolated pattern 440 of green pixels is produced by 75% of original pixels, while interpolated pattern 340 of clear pixels is produced by 50% of original pixels, interpolated pattern 440 will produce better resolution. In addition, luminance image is typically represented by green signals.

Figure 5A:
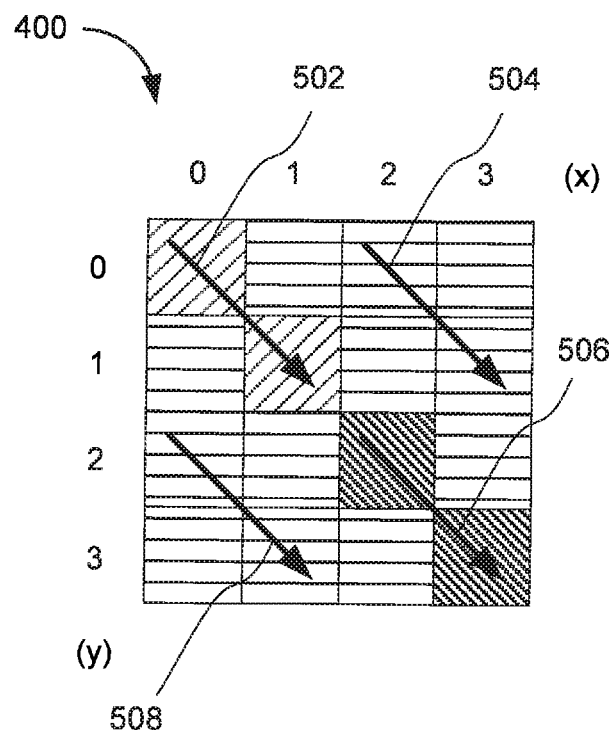
FIG. 5A shows pixels being 45° diagonally binned, in accordance with the present invention.
Figure 5B:
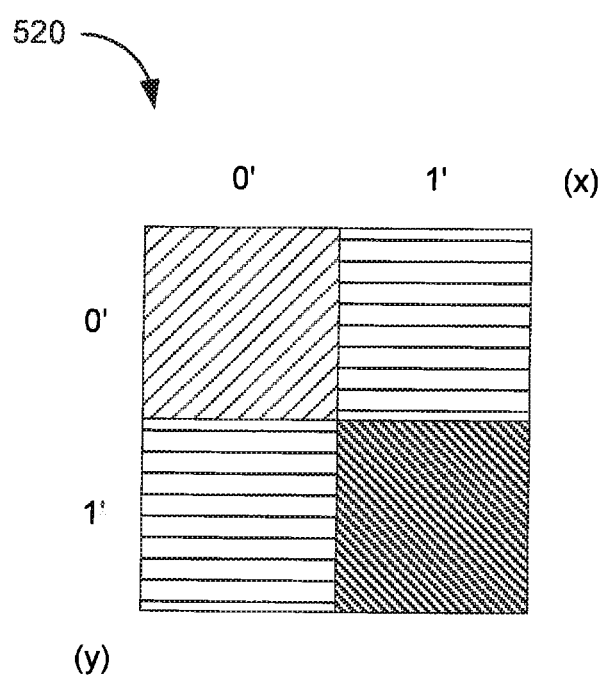
FIG. 5B shows 45° diagonally binned pixels becoming a Bayer pattern, in accordance with the present invention.

In an embodiment, blue pixels (0,0) and (1,1) are 45° diagonally binned as shown by an arrow 502 in FIG. 5A, in accordance with the present invention. 45° is referred to the positive directions of x and y as shown in FIG. 5A. The binned pixel becomes pixel (0',0') in a Bayer pattern 520 as shown in FIG. 5B, in accordance with the present invention. Green pixels (2,0) and (3,1) are 45° diagonally binned as shown by an arrow 504 in FIG. 5A. The binned pixel becomes pixel (1',0') in Bayer pattern 520. Red pixels (2,2) and (3,3) are 45° diagonally binned as shown by an arrow 506 in FIG. 5A. The binned pixel becomes pixel (1',1') in Bayer pattern 520. Green pixels (0,2) and (1,3) are 45° diagonally binned as shown by an arrow 508 in FIG. 5A. The binned pixel becomes pixel (0',1') in Bayer pattern 520.

Figure 6A:
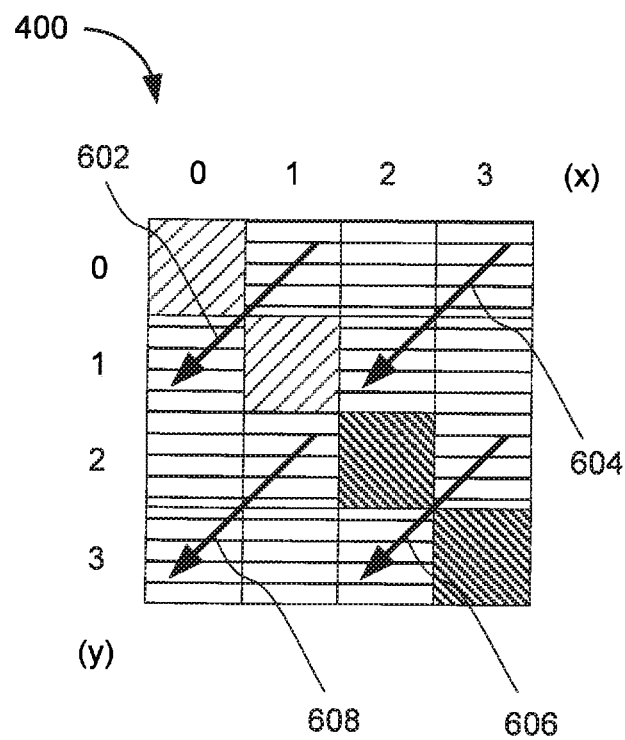
FIG. 6A shows pixels being 135° diagonally binned, in accordance with the present invention.
Figure 6B:
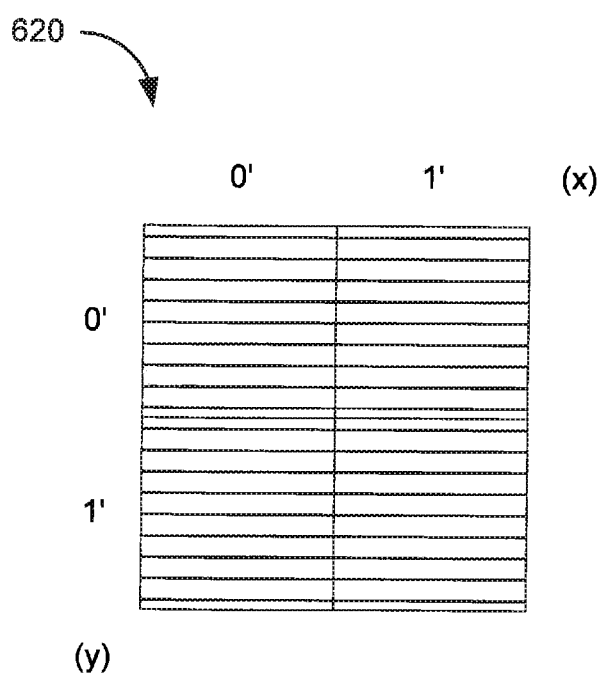
FIG. 6B shows 135° diagonally binned pixels becoming an all-green pattern, in accordance with the present invention.

Furthermore, green pixels (1,0) and (0,1) are 135° diagonally binned as shown by an arrow 602 in FIG. 6A, in accordance with the present invention. 135° is referred to the negative direction of x and the positive direction of y as shown in FIG. 6A. 135° diagonal direction is opposite to 45° diagonal direction. The binned pixel becomes pixel (0',0') in an all-green pattern 620 as shown in FIG. 6B, in accordance with the present invention. Green pixels (3,0) and (2,1) are 135° diagonally binned as shown by an arrow 604 in FIG. 6A. The binned pixel becomes pixel (1',0') in all-green pattern 620. Green pixels (3,2) and (2,3) are 135° diagonally binned as shown by an arrow 606 in FIG. 6A. The binned pixel becomes pixel (1',1') in all-green pattern 620. Green pixels (1,2) and (0,3) are 135° diagonally binned as shown by an arrow 608 in FIG. 6A. The binned pixel becomes pixel (0',1') in all-green pattern 620. All-green pattern 620 consists of all green pixels.

Bayer pattern 520 and all-green pattern 620 have same format. Green pixels in Bayer pattern 520 and green pixels in all-green pattern 620, which may be a green channel, can be fused together without difficulties. It is easier to recover missing green information, which is a required step in fuse algorithms. It is appreciated that the fuse of green pixels in Bayer pattern 520 and all-green pattern 620 can produce full resolution, although Bayer pattern 520 itself contains reduced resolution. Thus, the combination of Bayer pattern 520 and all-green pattern 620 eventually produces an image having R, G, and B signals in full resolution. The image produced has better color and resolution performance as compared with that produced by RGBC pattern (e.g., FIG. 3A). It has been discussed that in RGBC pattern, the full resolution is based on clear pixels, which have 50% contribution of original pixels, but in minimal repeating unit 400 disclosed in FIG. 4A, the full resolution is based on green pixels, which have 75% contribution of original pixels.

Figure 7:
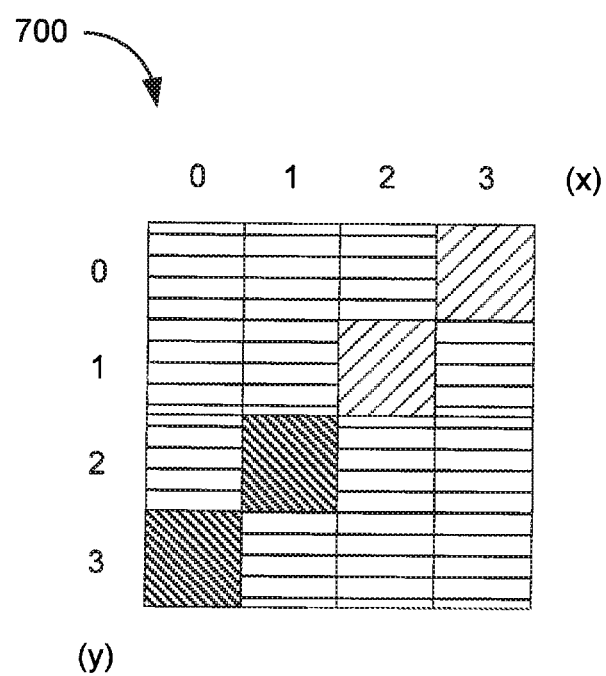
FIG. 7 shows a minimal repeating unit having an alternative pattern to the minimal repeating unit of FIG. 4A, in accordance with the present invention.

FIG. 7 shows a minimal repeating unit 700, which has an alternative pattern to minimal repeating unit 400 consisting of 4×4 pixels, in accordance with the present invention. Minimal repeating unit 700 is a mirror image of minimal repeating unit 400, flipped over horizontally, i.e., left side becomes right side and vise versa. Signals detected in minimal repeating unit 700 are processed in a similar manner as those in minimal repeating unit 400 in a mirror symmetry. Minimal repeating unit 700 is:

| G | G | G | B |
| G | G | B | G |
| G | R | G | G |
| R | G | G | G. |

B stands for blue pixel, G stands for green pixel, and R stands for red pixel.

In an embodiment, a sensor comprises a pixel array having a minimal repeating unit. A minimal repeating unit is immediately next to another repeating unit in row and column directions. Minimal repeating units are arranged in a pixel array as shown in FIG. 2D.

Figure 8A:
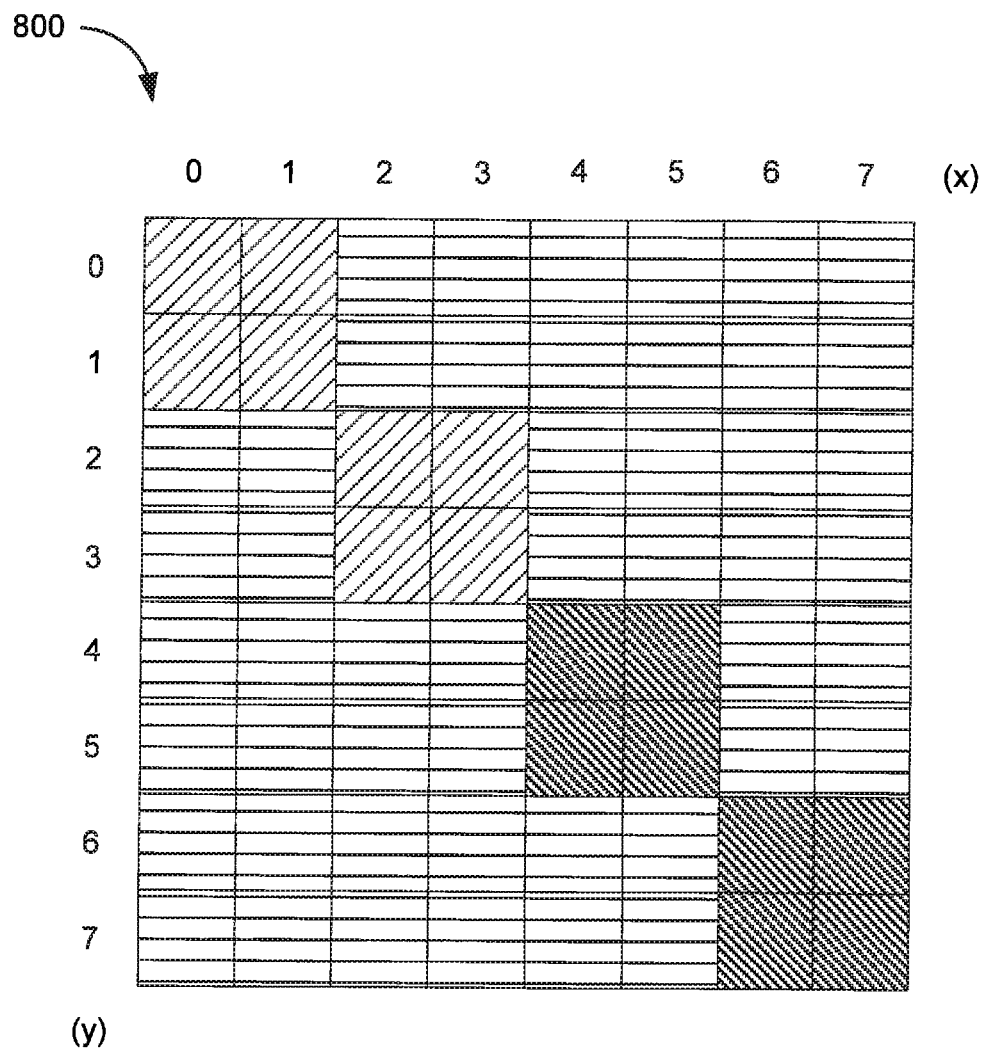
FIG. 8A shows a minimal repeating unit consisting of 8×8 pixels, in accordance with the present invention.

FIG. 8A shows a minimal repeating unit 800 consisting of 8×8 pixels, in accordance with the present invention. Pixels (0,0), (1,0), (0,1), and (1,1) are blue pixels. Pixels (2,2), (2,3), (3,2), and (3,3) are also blue pixels. Pixels (4,4), (5,4), (4,5), and (5,5) are red pixels. Pixels (6,6), (7,6), (6,7), and (7,7) are also red pixels. The rest of the pixels in minimal repeating unit 800 are green pixels. Minimal repeating unit 800 has 64 pixels, which have 75% part of green pixels (i.e., 48 green pixels), 12.5% part of blue pixels (i.e., 8 blue pixels), 12.5% part of red pixels (i.e., 8 red pixels), and no clear pixel. Minimal repeating unit 800 is:

| B | B | G | G | G | G | G | G |
| B | B | G | G | G | G | G | G |
| G | G | B | B | G | G | G | G |
| G | G | B | B | G | G | G | G |
| G | G | G | G | R | R | G | G |
| G | G | G | G | R | R | G | G |
| G | G | G | G | G | G | R | R |
| G | G | G | G | G | G | R | R. |

B stands for blue pixel, G stands for green pixel, and R stands for red pixel.

The minimal repeating unit described above may be binned in a four-to-one binning. For example, four pixels having same color are binned becoming a pixel in a binned format. Thus, the binned format is:

| B | G | G | G |
| G | B | G | G |
| G | G | R | G |
| G | G | G | R. |

The binned format is same as minimal repeating unit 400 shown in FIG. 4A. A primary effect of this binning will increase the sensitivity of the image sensor, because signals from four pixels are binned. It may be useful for taking image or video in low light environment. It may increase signal to noise ratio of the detected image or video.

After binned format is obtained, the same process as described for FIGS. 4A-6B may be performed. In addition to the advantages as described for FIGS. 4A-6B, minimal repeating unit 800 brings the benefit of higher sensitivity for low light.

Figure 8B:
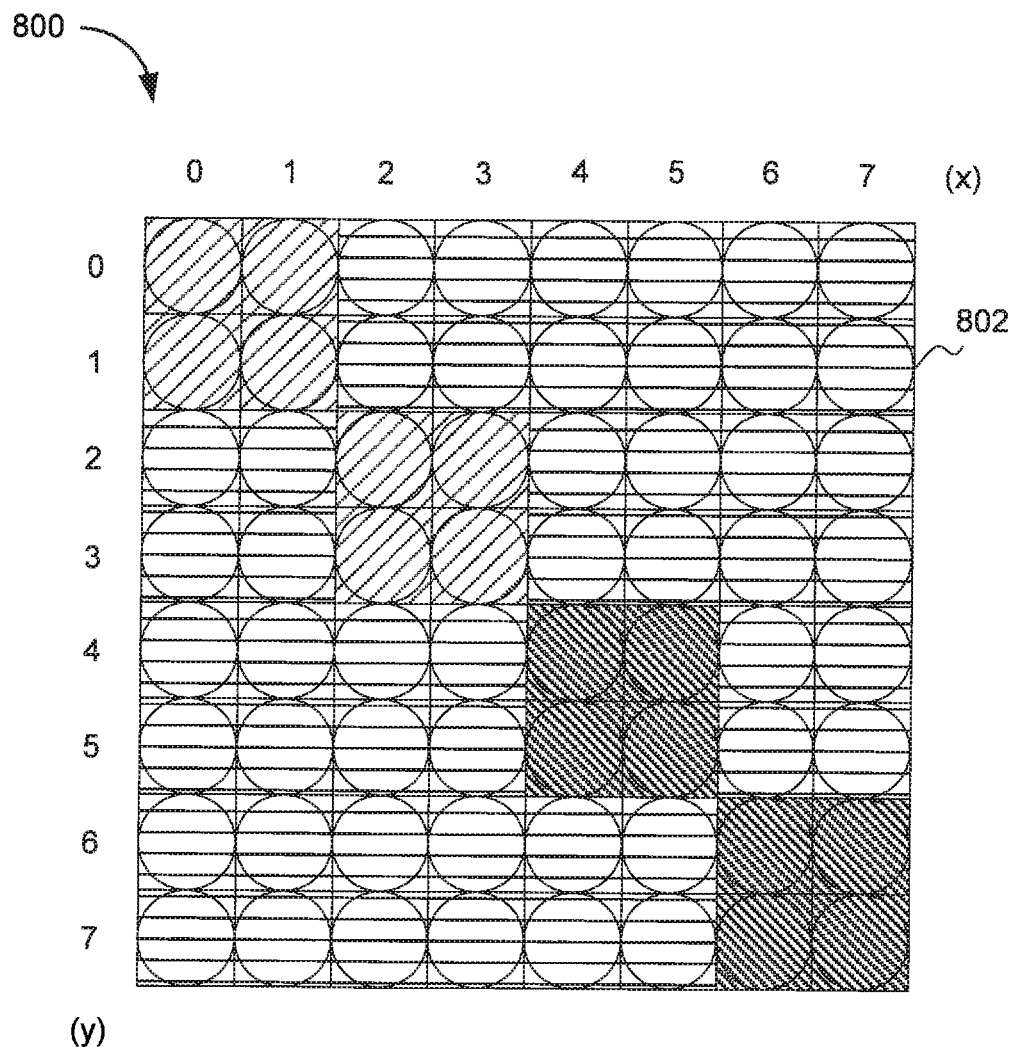
FIG. 8B shows a minimal repeating unit of FIG. 8A, where each pixel of the minimal repeating unit has a microlens, in accordance with the present invention.

In an embodiment, each pixel includes a microlens as shown in FIG. 1A. FIG. 8B shows a minimal repeating unit 800 of a pixel array, in accordance with the present invention. Each pixel of minimal repeating unit 800 has a microlens 802. R, G, and B signals generated from binning may be in the lower resolution of the binned format, e.g., 50M, instead of the higher resolution, e.g., 200M (before binning). It is possible to have these signals back in the higher resolution.

On the other hand, the image sensor may have high resolution or high number of pixels, for example 200M pixels, for high resolution imaging. However, for video application, lower resolution or lower number of pixels, for example 50M pixels, may be sufficient, one of the reasons is because standard video frame rate is limited. Accordingly, for example, 200M pixel image sensor may be down sampled to 50M pixel. In other words, full resolution may not be needed.

Figure 8C:
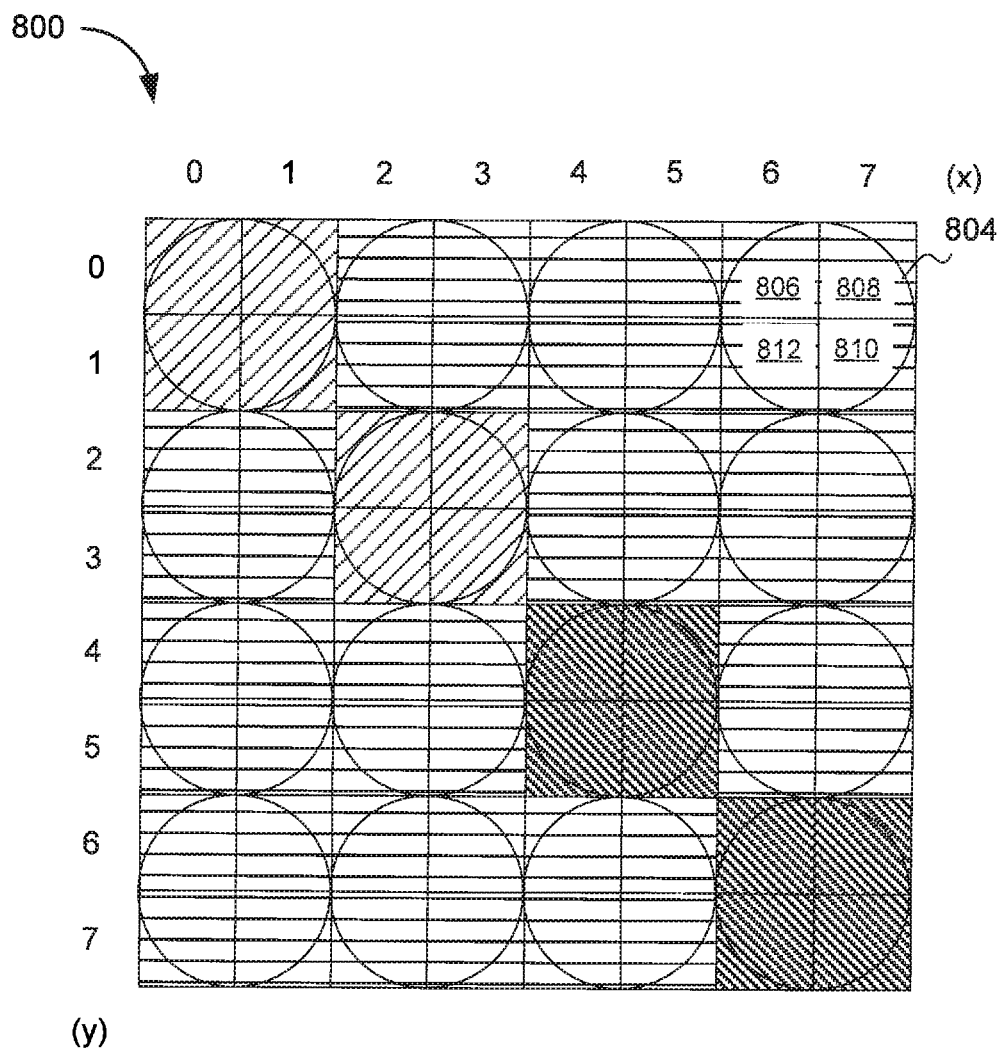
FIG. 8C shows a minimal repeating unit of FIG. 8A, where a microlens covers four pixels of the minimal repeating unit, in accordance with the present invention.

In an embodiment, a microlens covers four pixels as shown in FIG. 1B. FIG. 8C shows a minimal repeating unit 800 of a pixel array, in accordance with the present invention. A microlens 804 may cover four pixels 806, 808, 810, and 812 of minimal repeating unit 800. Microlens 804 may cover neighboring four pixels of same color. A microlens may cover four neighboring pixels of different colors (not shown).

A phase difference between pixels 806 and 808, and between pixels 812 and 810, in row direction, can be detected. A phase difference between pixels 806 and 812, and between pixels 808 and 810, in column direction, can be detected. A phase difference between pixels 806 and 810, in 45° diagonal direction, can be detected. A phase difference between pixels 808 and 812, in 135° diagonal direction, can be detected. Thus, phase detection auto-focus (PDAF) may be performed. The embodiment shown in FIG. 8C may bring additional benefit of auto-focusing.

Figure 9:
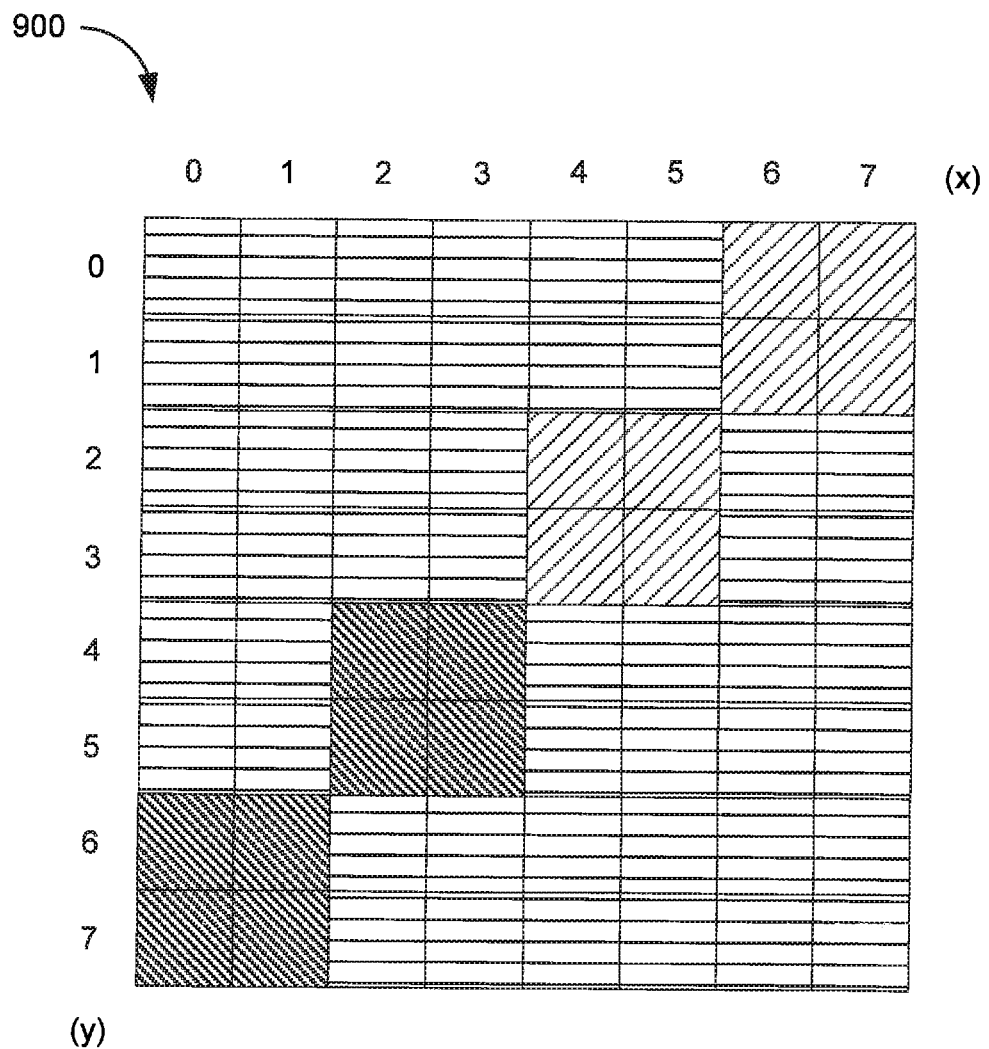
FIG. 9 shows a minimal repeating unit having an alternative pattern to the minimal repeating unit of FIG. 8A, in accordance with the present invention.

FIG. 9 shows a minimal repeating unit 900, which has an alternative pattern to minimal repeating unit 800 consisting of 8×8 pixels, in accordance with the present invention. Minimal repeating unit 900 is a mirror image of minimal repeating unit 800, flipped over horizontally, i.e., left side becomes right side and vise versa. Signals detected in minimal repeating unit 900 are processed in a similar manner as those in minimal repeating unit 800 in a mirror symmetry. Minimal repeating unit 900 is:

| G | G | G | G | G | G | B | B |
|---|---|---|---|---|---|---|---|
| G | G | G | G | G | G | B | B |
| G | G | G | G | B | B | G | G |
| G | G | G | G | B | B | G | G |
| G | G | R | R | G | G | G | G |
| G | G | R | R | G | G | G | G |
| R | R | G | G | G | G | G | G |
| R | R | G | G | G | G | G | G. |

B stands for blue pixel, G stands for green pixel, and R stands for red pixel.

Figure 10:
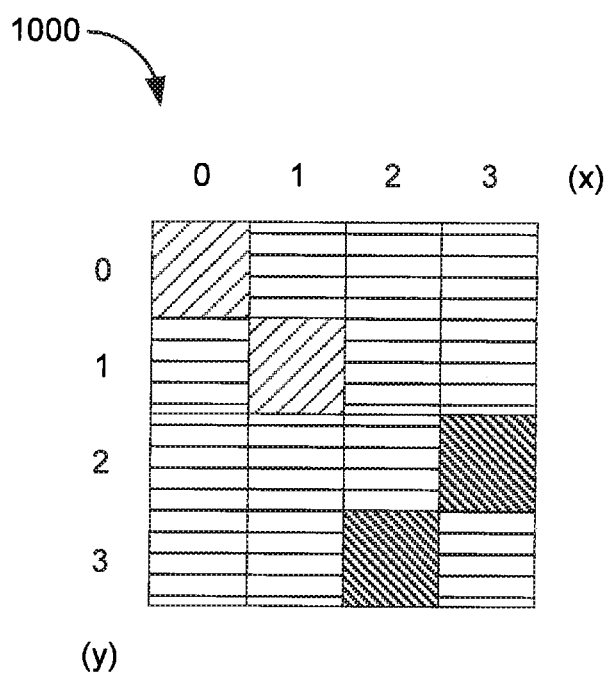
FIG. 10 shows a minimal repeating unit consisting of 4×4 pixels, in accordance with the present invention.

In an embodiment, FIG. 10 shows a minimal repeating unit 1000 consisting of 4×4 pixels, in accordance with the present invention. Pixels (0,0) and (1,1) are first color pixels. Pixels (2,3) and (3,2) are second color pixels. Pixels (1,0), (2,0), (3,0), (0,1), (2,1), (3,1), (0,2), (1,2), (2,2), (0,3), (1,3), and (3,3) are green pixels. Minimal repeating unit 1000 has 16 pixels, which have 75% part of green pixels (i.e., 12 green pixels), 12.5% part of blue pixels (i.e., 2 blue pixels), 12.5% part of red pixels (i.e., 2 red pixels), and no clear pixel. Minimal repeating unit 1000 is:

| FC | G  | G  | G  |
|----|----|----|----|
| G  | FC | G  | G  |
| G  | G  | G  | SC |
| G  | G  | SC | G. |

FC stands for first color pixel, G stands for green pixel, and SC stands for second color pixel.

In an embodiment, first color (FC) is blue (B), and second color (SC) is red (R). In another embodiment, first color (FC) is red (R), and second color (SC) is blue (B). In other words, the first color is one of blue and red, the second color is one of blue and red, and the second color is different from the first color.

Figure 11A:
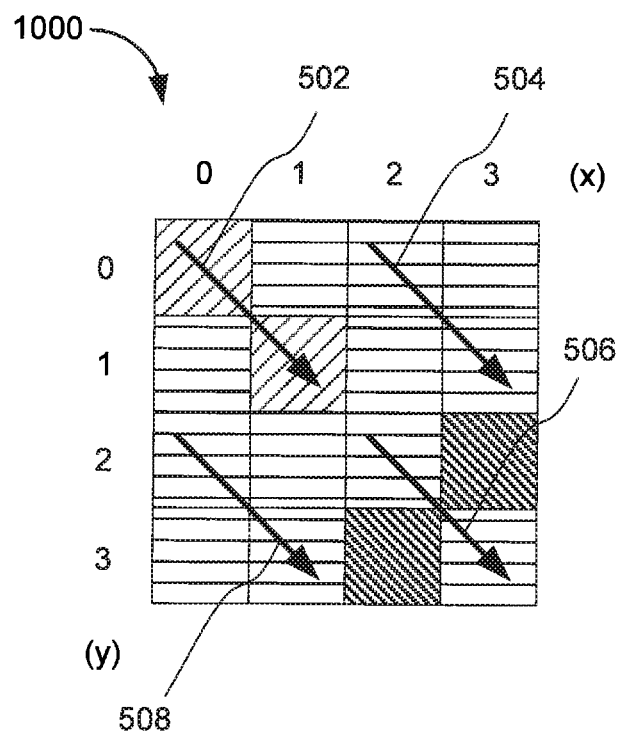
FIG. 11A shows pixels being 45° diagonally binned, in accordance with the present invention.
Figure 11B:
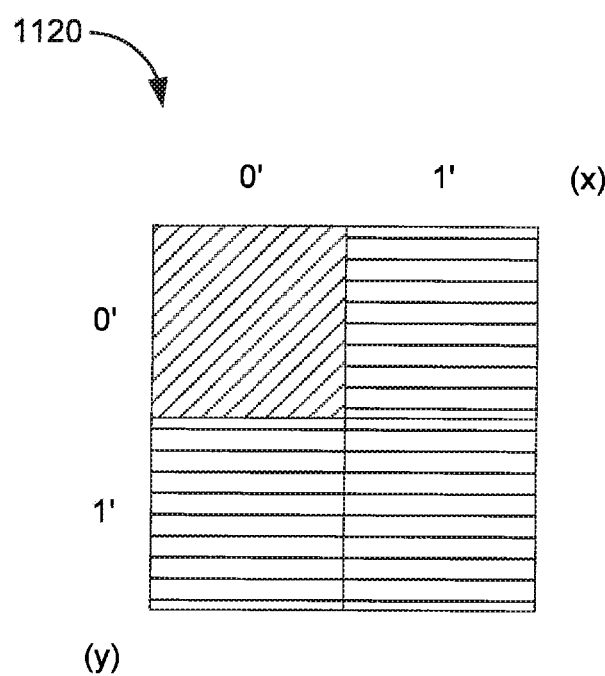
FIG. 11B shows 45° diagonally binned pixels becoming a first-color-green pattern, in accordance with the present invention.

In an embodiment, FC pixels (0,0) and (1,1) are 45° diagonally binned as shown by an arrow 502 in FIG. 11A, in accordance with the present invention. The binned pixel becomes pixel (0',0') in a FC-green pattern 1120 as shown in FIG. 11B, in accordance with the present invention. Green pixels (2,0) and (3,1) are 45° diagonally binned as shown by an arrow 504 in FIG. 11A. The binned pixel becomes pixel (1',0') in FC-green pattern 1120. Green pixels (2,2) and (3,3) are 45° diagonally binned as shown by an arrow 506 in FIG. 11A. The binned pixel becomes pixel (1',1') in FC-green pattern 1220. Green pixels (0,2) and (1,3) are 45° diagonally binned as shown by an arrow 508 in FIG. 11A. The binned pixel becomes pixel (0',1') in FC-green pattern 1220. The FC-green pattern is:

| FC | G  |
|----|----|
| G  | G. |

Figure 12A:
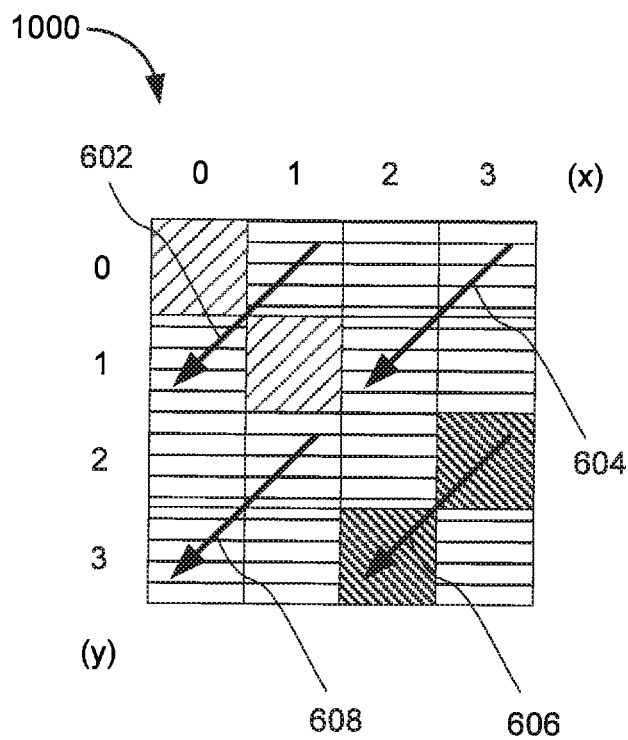
FIG. 12A shows pixels being 135° diagonally binned, in accordance with the present invention.
Figure 12B:
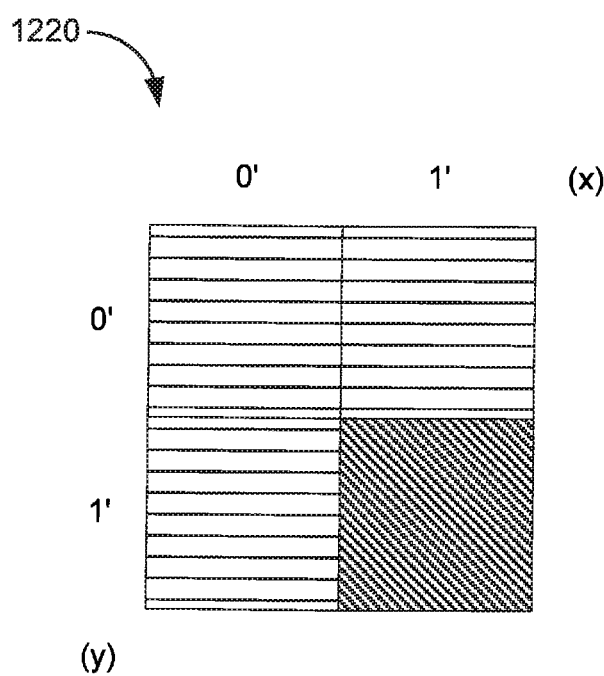
FIG. 12B shows 135° diagonally binned pixels becoming a second-color-green pattern, accordance with the present invention.

Furthermore, green pixels (1,0) and (0,1) are 135° diagonally binned as shown by an arrow 602 in FIG. 12A, in accordance with the present invention. The binned pixel becomes pixel (0',0') in a SC-green pattern 1220 as shown in FIG. 12B, in accordance with the present invention. Green pixels (3,0) and (2,1) are 135° diagonally binned as shown by an arrow 604 in FIG. 12A. The binned pixel becomes pixel (1',0') in SC-green pattern 1220. SC pixels (3,2) and (2,3) are 135° diagonally binned as shown by an arrow 606 in FIG. 12A. The binned pixel becomes pixel (1',1') in SC-green pattern 1220. Green pixels (1,2) and (0,3) are 135° diagonally binned as shown by an arrow 608 in FIG. 12A. The binned pixel becomes pixel (0',1') in SC-green pattern 1220. The SC-green pattern is:

| G | G   |
|---|-----|
| G | SC. |

The combination and rearrangement of FC-green pattern 1120 and SC-green pattern 1220 may produce a Bayer pattern such as Bayer pattern 200 in FIG. 2A (Bayer pattern 520 in FIG. 5B), and an all-green pattern such as all-green pattern 620 in FIG. 6B. The previous discussion (FIGS. 5A-6B) discloses that the fuse of the Bayer pattern and the all-green pattern produces an image having R, G, and B signals in full resolution. Similarly, the combination and rearrangement of FC-green pattern 1220 and SC-green pattern 1320 may produce an image having R, G, and B signals in full resolution, and provide more balanced green information in both 45° and 135° diagonal directions.

Figure 13:
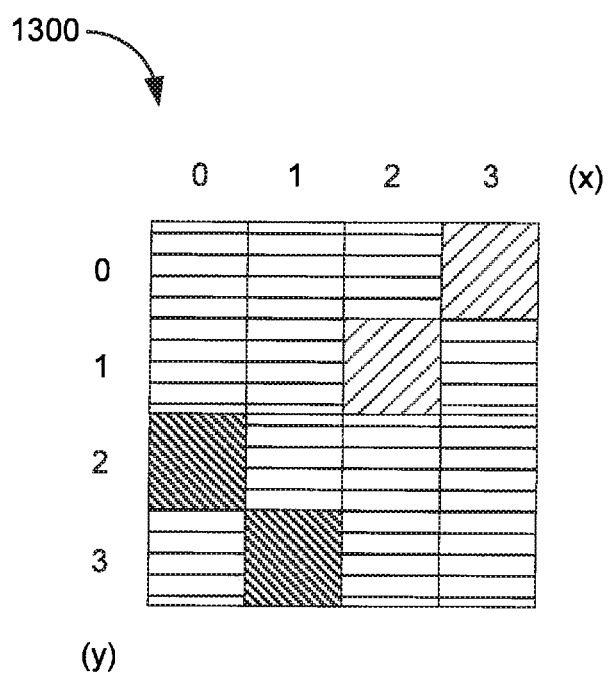
FIG. 13 shows a minimal repeating unit having an alternative pattern to the minimal repeating unit of FIG. 10, in accordance with the present invention.

FIG. 13 shows a minimal repeating unit 1300, which has an alternative pattern to minimal repeating unit 1000 consisting of 4×4 pixels, in accordance with the present invention. Minimal repeating unit 1300 is a mirror image of minimal repeating unit 1000, flipped over horizontally, i.e., left side becomes right side and vise versa. Signals detected in minimal repeating unit 1400 are processed in a similar manner as those in minimal repeating unit 1000 in a mirror symmetry. Minimal repeating unit 1300 is:

| G | G | G | FC |
|---|---|---|---|
| G | G | FC | G |
| SC | G | G | G |
| G | SC | G | G. |

FC stands for first color pixel, G stands for green pixel, and SC stands for second color pixel.

In an embodiment, first color (FC) is blue (B), and second color (SC) is red (R). In another embodiment, first color (FC) is red (R), and second color (SC) is blue (B). In other words, the first color is one of blue and red, the second color is one of blue and red, and the second color is different from the first color.

Figure 14A:
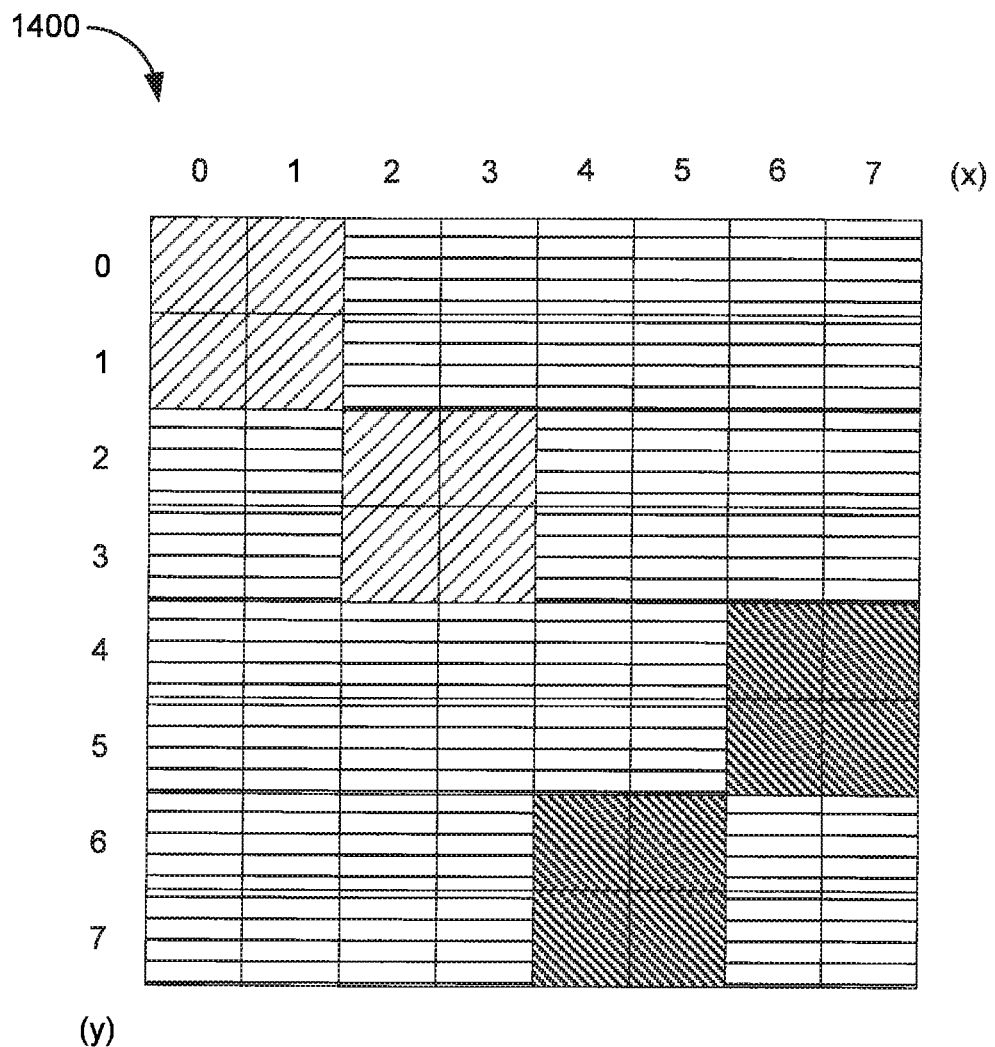
FIG. 14A shows a minimal repeating unit consisting 8×8 pixels, in accordance with the present invention.

In an embodiment, FIG. 14A shows a minimal repeating unit 1400 consisting of 8×8 pixels, in accordance with the present invention. Pixels (0,0), (1,0), (0,1), and (1,1) are first color pixels. Pixels (2,2), (2,3), (3,2), and (3,3) are also first color pixels. Pixels (6,4), (7,4), (6,5), and (7,5) are second color pixels. Pixels (4,6), (5,6), (4,7), and (5,7) are also second color pixels. The rest of the pixels in the minimal repeating unit 1400 are green pixels. Minimal repeating unit 1400 has 64 pixels, which have 75% part of green pixels (i.e., 48 green pixels), 12.5% part of blue pixels (i.e., 8 blue pixels), 12.5% part of red pixels (i.e., 8 red pixels), and no clear pixel. Minimal repeating unit 1400 is:

| FC | FC | G | G | G | G | G | G |
|---|---|---|---|---|---|---|---|
| FC | FC | G | G | G | G | G | G |
| G | G | FC | FC | G | G | G | G |
| G | G | FC | FC | G | G | G | G |
| G | G | G | G | G | G | SC | SC |
| G | G | G | G | G | G | SC | SC |
| G | G | G | G | SC | SC | G | G |
| G | G | G | G | SC | SC | G | G. |

FC stands for first color pixel, G stands for green pixel, and SC stands for second color pixel.

In an embodiment, first color (FC) is blue (B), and second color (SC) is red (R). In another embodiment, first color (FC) is red (R), and second color (SC) is blue (B). In other words, the first color is one of blue and red, the second color is one of blue and red, and the second color is different from the first color.

The minimal repeating unit described above may be binned in a four-to-one binning. For example, four pixels having same color are binned becoming a pixel in a binned format. Thus, the binned format is:

| FC | G | G | G |
|---|---|---|---|
| G | FC | G | G |
| G | G | G | SC |
| G | G | SC | G. |

The binned format is same as minimal repeating unit 1000 shown in FIG. 10. A primary effect of this binning will increase the sensitivity of the image sensor, because signals from four pixels are binned. It may be useful for taking image or video in low light environment. It may increase signal to noise ratio of the detected image or video.

After binned format is obtained, the same process as disclosed in FIGS. 11A-12B may be performed. In addition to the advantages as disclosed in FIGS. 11A-12B, minimal repeating unit 1400 brings the benefit of higher sensitivity for low light.

Figure 14B:
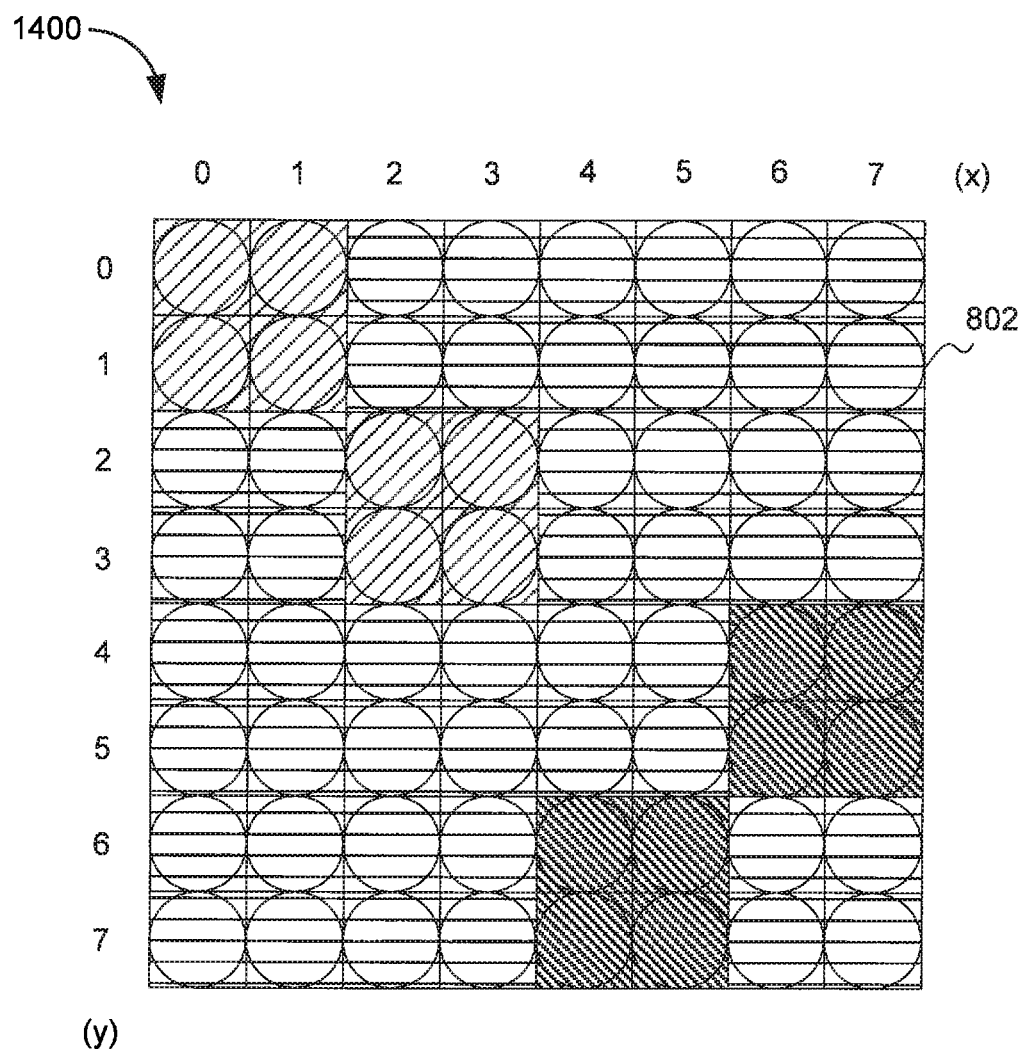
FIG. 14B shows a minimal repeating unit of FIG. 14A, where each pixel of the minimal repeating unit has a microlens, in accordance with the present invention.

In an embodiment, each pixel includes a microlens as shown in FIG. 1A. FIG. 14B shows a minimal repeating unit 1400 of a pixel array, in accordance with the present invention. Each pixel of minimal repeating unit 1400 has a microlens 802. R, G, and B signals generated from binning may be in the lower resolution of the binned format, e.g., 50M, instead of the higher resolution, e.g., 200M. It is still possible to have these signals in the higher resolution.

Figure 14C:
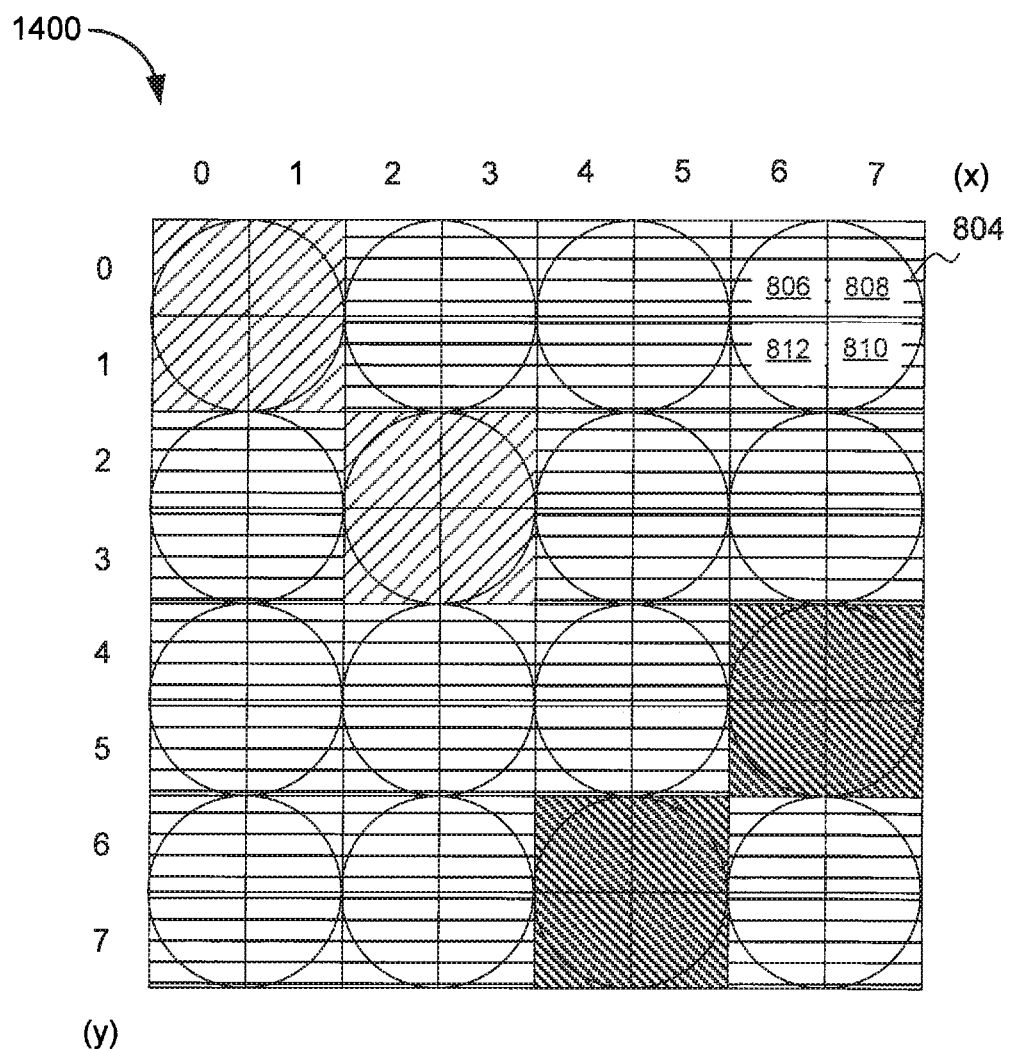
FIG. 14C shows a minimal repeating unit of FIG. 14A, where a microlens covers four pixels of the minimal repeating unit, in accordance with the present invention.

In an embodiment, a microlens covers four pixels as shown in FIG. 1B. FIG. 14C shows a minimal repeating unit 1400, in accordance with the present invention. A microlens 804 may cover four pixels 806, 808, 810, and 812 of minimal repeating unit 1400. Microlens 804 may cover neighboring four pixels of same color. It is possible that a microlens covers four neighboring pixels of different colors (not shown).

A phase difference between pixels 806 and 808, and between pixels 812 and 810, in row direction, can be detected. A phase difference between pixels 806 and 812, and between pixels 808 and 810, in column direction, can be detected. A phase difference between pixels 806 and 810, in 45° diagonal direction, can be detected. A phase difference between pixels 808 and 812, in 135° diagonal direction, can be detected. Thus, phase detection auto-focus (PDAF) may be performed. The embodiment shown in FIG. 14C may bring additional benefit of auto-focusing.

Figure 15:
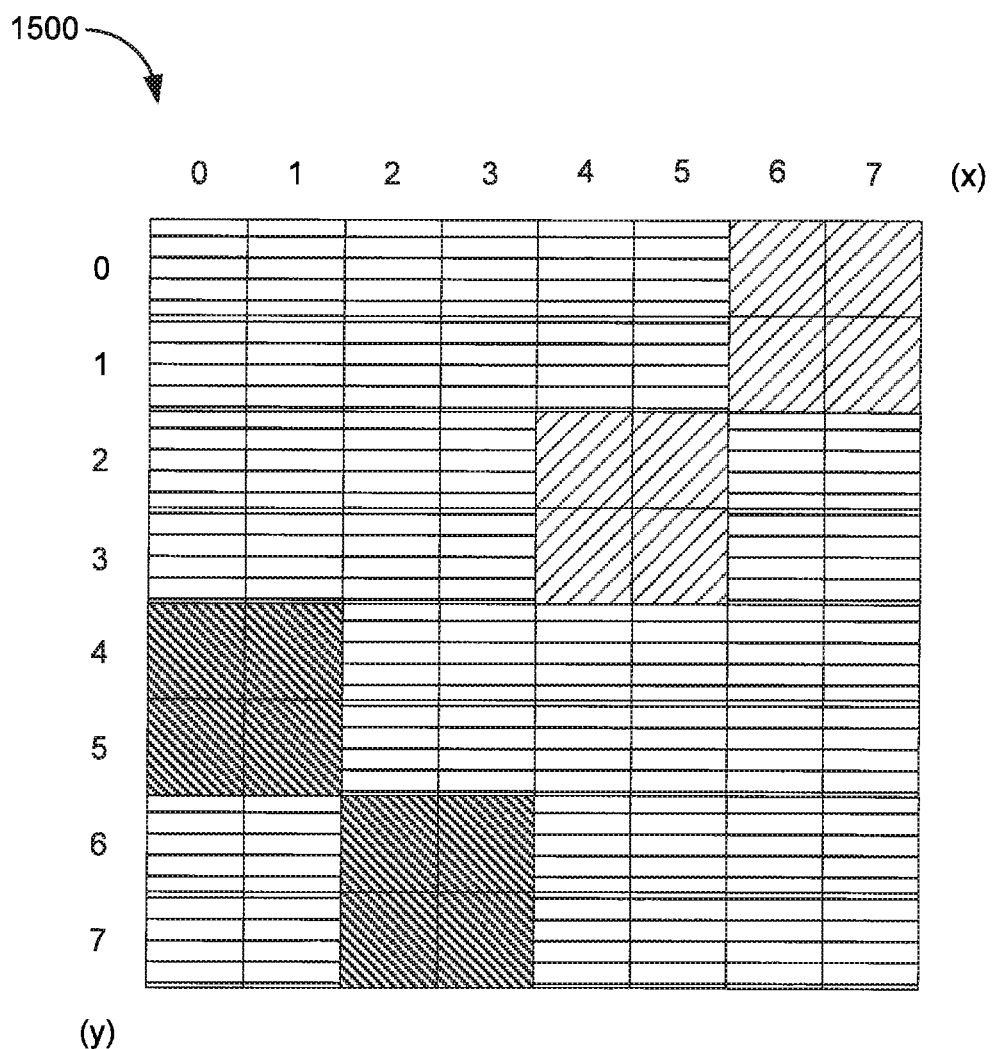
FIG. 15 shows a minimal repeating unit having an alternative pattern to the minimal repeating unit of FIG. 14A, in accordance with the present invention.

FIG. 15 shows a minimal repeating unit 1500, which has an alternative pattern to minimal repeating unit 1400 consisting of 8×8 pixels, in accordance with the present invention. Minimal repeating unit 1500 is a mirror image of minimal repeating unit 1400, flipped over horizontally, i.e., left side becomes right side and vise versa. Signals detected in minimal repeating unit 1500 are processed in a similar manner as those in minimal repeating unit 1400 in a mirror symmetry. Minimal repeating unit 1500 is:

| G | G | G | G | G | G | FC | FC |
|---|---|---|---|---|---|---|---|
| G | G | G | G | G | G | FC | FC |
| G | G | G | G | FC | FC | G | G |
| G | G | G | G | FC | FC | G | G |
| SC | SC | G | G | G | G | G | G |
| SC | SC | G | G | G | G | G | G |
| G | G | SC | SC | G | G | G | G |
| G | G | SC | SC | G | G | G | G. |

FC stands for first color pixel, G stands for green pixel, and SC stands for second color pixel.

In an embodiment, first color (FC) is blue (B), and second color (SC) is red (R). In another embodiment, first color (FC) is red (R), and second color (SC) is blue (B). In other words, the first color is one of blue and red, the second color is one of blue and red, and the second color is different from the first color.

While the present invention has been described herein with respect to the exemplary embodiments and the best mode for practicing the invention, it will be apparent to one of ordinary skill in the art that many modifications, improvements and sub-combinations of the various embodiments, adaptations, and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor comprising a pixel array having a minimal repeating unit, wherein the minimal repeating unit consists of 4×4 pixels including 12 green pixels, 2 blue pixels, and 2 red pixels; wherein a minimal repeating unit is immediately next to another minimal repeating unit in row and column directions.

2. The image sensor of claim 1, wherein the minimal repeating unit is:

| B | G | G | G |
|---|---|---|---|
| G | B | G | G |
| G | G | R | G |
| G | G | G | R, | wherein B stands for a blue pixel, G stands for a green pixel, and R stands for a red pixel.

3. The image sensor of claim 2, wherein the minimal repeating unit is diagonally binned in a first direction to produce a Bayer pattern, and wherein the minimal repeating unit is diagonally binned in a second direction, the second direction opposite to the first direction, to produce a pattern consisting of all green pixels.

4. The image sensor of claim 1, wherein the minimal repeating unit is:

| G | G | G | B |
|---|---|---|---|
| G | G | B | G |
| G | R | G | G |
| R | G | G | G, | wherein B stands for a blue pixel, G stands for a green pixel, and R stands for a red pixel.

5. The image sensor of claim 4, wherein the minimal repeating unit is diagonally binned in a first direction to produce a Bayer pattern, and wherein the minimal repeating unit is diagonally binned in a second direction, the second direction opposite to the first direction, to produce a pattern consisting of all green pixels.

6. The image sensor of claim 1, wherein the minimal repeating unit is:

| FC | G  | G  | G  |
|----|----|----|----|
| G  | FC | G  | G  |
| G  | G  | G  | SC |
| G  | G  | SC | G, | wherein G stands for a green pixel, FC stands for a first color pixel, and SC stands for a second color pixel; and wherein the first color is one of blue and red, the second color is one of blue and red, and the second color is different from the first color.

7. The image sensor of claim 6, wherein the minimal repeating unit is diagonally binned in a first direction to produce a first-color-green pattern having no second color pixel, and wherein the minimal repeating unit is diagonally binned in a second direction, the second direction opposite to the first direction, to produce a second-color-green pattern having no first color pixel.

8. The image sensor of claim 1, wherein the minimal repeating unit is:

| G  | G  | G  | FC |
|----|----|----|----|
| G  | G  | FC | G  |
| SC | G  | G  | G  |
| G  | SC | G  | G, | wherein G stands for a green pixel, FC stands for a first color pixel, and SC stands for a second color pixel; and wherein the first color is one of blue and red, the second color is one of blue and red, and the second color is different from the first color.

9. The image sensor of claim 8, wherein the minimal repeating unit is diagonally binned in a first direction to produce a first-color-green pattern having no second color pixel, and wherein the minimal repeating unit is diagonally binned in a second direction, the second direction opposite to the first direction, to produce a second-color-green pattern having no first color pixel.

10. An image sensor comprising an image pixel array having a minimal repeating unit, wherein the minimal repeating unit consists of 8×8 pixels including 48 green pixels, 8 blue pixels, and 8 red pixels; wherein a minimal repeating unit is immediately next to another minimal repeating unit in row and column directions.

11. The image sensor of claim 10 wherein the minimal repeating unit is:

| B | B | G | G | G | G | G | G |
|---|---|---|---|---|---|---|---|
| B | B | G | G | G | G | G | G |
| G | G | B | B | G | G | G | G |
| G | G | B | B | G | G | G | G |
| G | G | G | G | R | R | G | G |
| G | G | G | G | R | R | G | G |
| G | G | G | G | G | G | R | R |
| G | G | G | G | G | G | R | R, | wherein B stands for a blue pixel, G stands for a green pixel, and R stands for a red pixel.

12. The image sensor of claim 11, wherein each pixel of the minimal repeating unit has a microlens.

13. The image sensor of claim 11, wherein a microlens covers four pixels of the minimal repeating unit.

14. The image sensor of claim 11, wherein after four-to-one binning, the minimal repeating unit becomes:

| B | G | G | G  |
|---|---|---|----|
| G | B | G | G  |
| G | G | R | G  |
| G | G | G | R. |

15. The image sensor of claim 10 wherein the minimal repeating unit is:

| G | G | G | G | G | G | B | B |
|---|---|---|---|---|---|---|---|
| G | G | G | G | G | G | B | B |

-continued

| | | | | | | | |
|---|---|---|---|---|---|---|---|
| G | G | G | G | B | B | G | G |
| G | G | G | G | B | B | G | G |
| G | G | R | R | G | G | G | G |
| G | G | R | R | G | G | G | G |
| R | R | G | G | G | G | G | G |
| R | R | G | G | G | G | G | G, | wherein B stands for a blue pixel, G stands for a green pixel, and R stands for a red pixel.

16. The image sensor of claim 15, wherein each pixel of the minimal repeating unit has a microlens.

17. The image sensor of claim 15, wherein a microlens covers four pixels of the minimal repeating unit.

18. The image sensor of claim 15, wherein after four-to-one binning, the minimal repeating unit becomes:

| | | | |
|---|---|---|---|
| G | G | G | B |
| G | G | B | G |
| G | R | G | G |
| R | G | G | B. |

19. The image sensor of claim 10 wherein the minimal repeating unit is:

| | | | | | | | |
|---|---|---|---|---|---|---|---|
| FC | FC | G | G | G | G | G | G |
| FC | FC | G | G | G | G | G | G |
| G | G | FC | FC | G | G | G | G |
| G | G | FC | FC | G | G | G | G |
| G | G | G | G | G | G | SC | SC |
| G | G | G | G | G | G | SC | SC |
| G | G | G | G | SC | SC | G | G |
| G | G | G | G | SC | SC | G | G, | wherein G stands for a green pixel, FC stands for a first color pixel, and SC stands for a second color pixel; and
wherein the first color is one of blue and red, the second color is one of blue and red, and the second color is different from the first color.

20. The image sensor of claim 19, wherein each pixel of the minimal repeating unit has a microlens.

21. The image sensor of claim 19, wherein a microlens covers four pixels of the minimal repeating unit.

22. The image sensor of claim 19, wherein after four-to-one binning, the minimal repeating unit becomes:

| | | | |
|---|---|---|---|
| FC | G | G | G |
| G | FC | G | G |
| G | G | G | SC |
| G | G | SC | G. |

23. The image sensor of claim 10 wherein the minimal repeating unit is:

| | | | | | | | |
|---|---|---|---|---|---|---|---|
| G | G | G | G | G | G | FC | FC |
| G | G | G | G | G | G | FC | FC |
| G | G | G | G | FC | FC | G | G |
| G | G | G | G | FC | FC | G | G |
| SC | SC | G | G | G | G | G | G |
| SC | SC | G | G | G | G | G | G |
| G | G | SC | SC | G | G | G | G |
| G | G | SC | SC | G | G | G | G, | wherein G stands for a green pixel, FC stands for a first color pixel, and SC stands for a second color pixel; and
wherein the first color is one of blue and red, the second color is one of blue and red, and the second color is different from the first color.

24. The image sensor of claim 23, wherein each pixel of the minimal repeating unit has a microlens.

25. The image sensor of claim 23, wherein a microlens covers four pixels of the minimal repeating unit.

26. The image sensor of claim 23, wherein after four-to-one binning, the minimal repeating unit becomes:

| | | | |
|---|---|---|---|
| G | G | G | FC |
| G | G | FC | G |
| SC | G | G | G |
| G | SC | G | G. |

* * * * *